United States Patent Office 2,889,849
Patented June 9, 1959

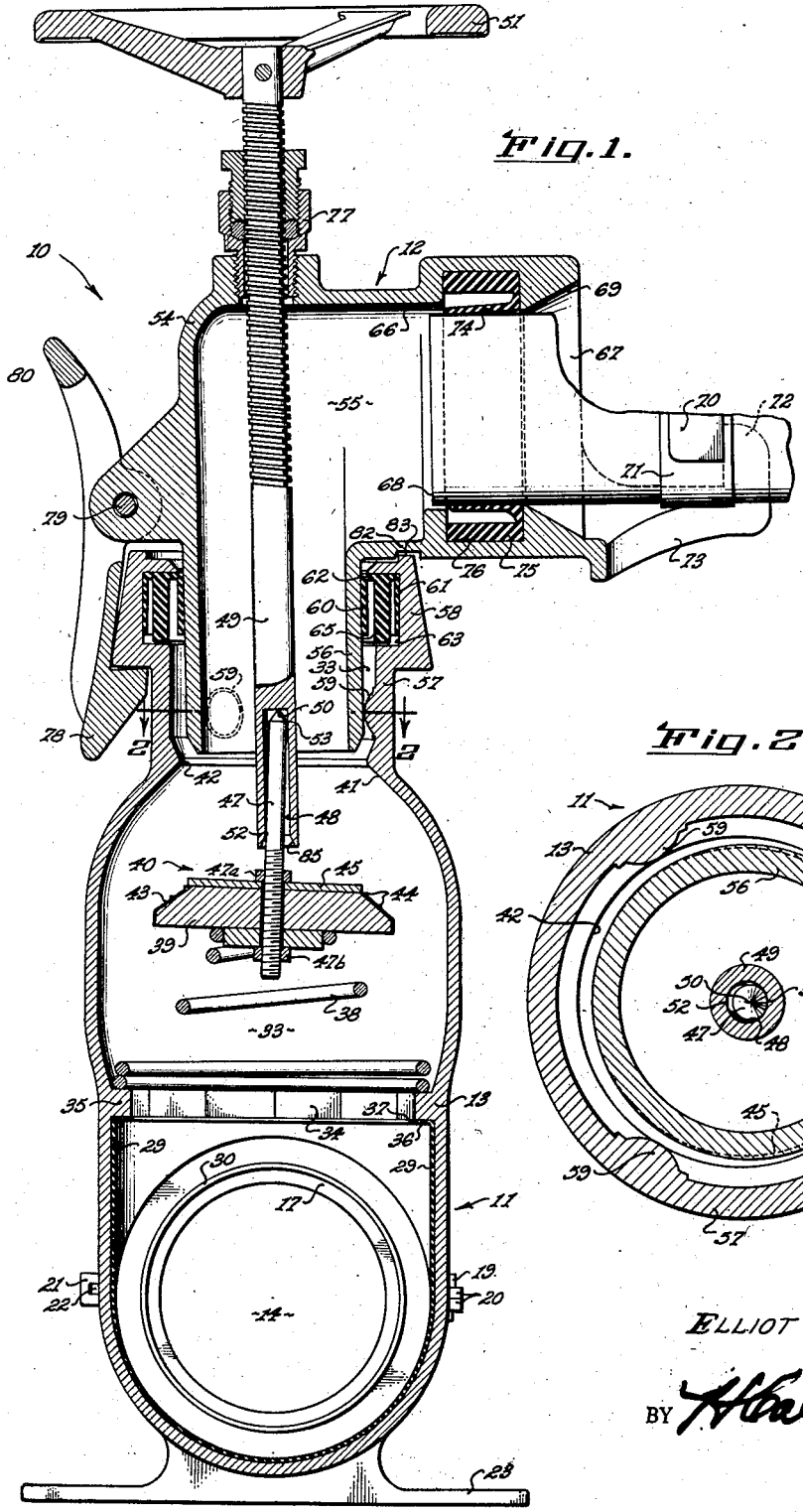

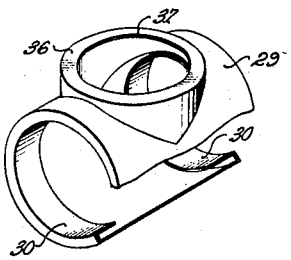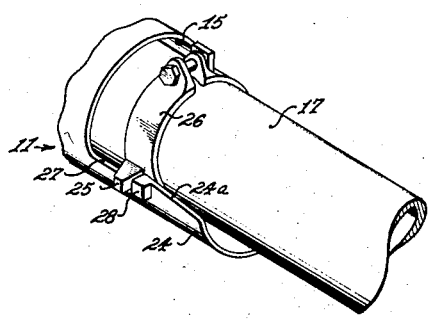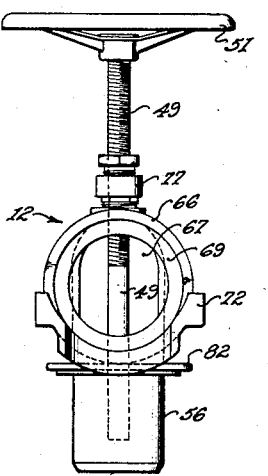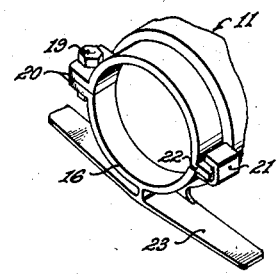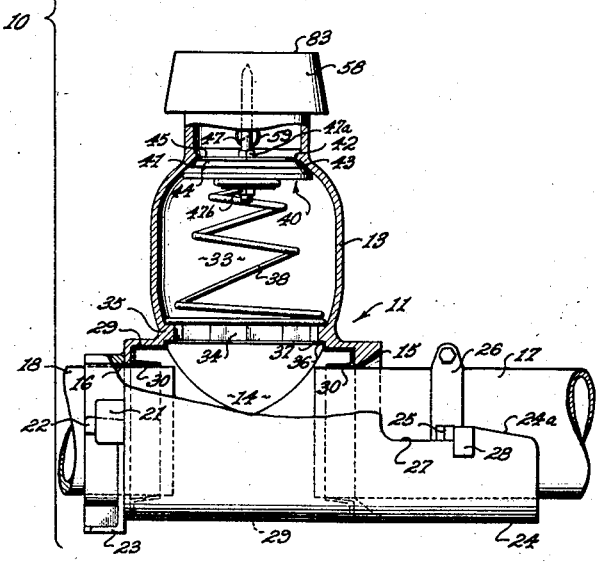

2,889,849

IRRIGATION VALVE

Elliot Shohan, San Bernardino, Calif.

Application January 28, 1957, Serial No. 636,712

17 Claims. (Cl. 137—322)

This invention relates generally to valving devices used in irrigation systems and more particularly has to do with the design and construction of an improved irrigation valving device temporarily installable in main pipe lines of portable irrigation systems and adapted to be quickly coupled with branch pipe lines and rapidly actuated so as to control water flow to sprinklers attached to the branch pipe lines. The invention is primarily concerned with improvements in valving devices of the above type which can be and normally are broken apart in the field when the valve is closed, and which are re-assembled for connection with branch pipe lines when it is desired to control flow from the main to the branch lines and sprinklers.

Valving devices capable of being broken down and re-assembled for the purposes outlined above, in connection with the operation of portable irrigation systems, have recently come into wide use largely as a result of the requirement that branch pipe lines be connectible into the main line at different points along its length, and of economics in inventory of valving equipment needed for irrigation control. Thus, a main irrigation line can be made up of sections of piping interconnected by valve component couplers, each of which can be coupled to a branch pipe line through a valve actuating head assembly connectible to the coupler to make up the complete valving device.

However, previously available devices of this general type present certain disadvantages and difficulties in use mostly having to do with improper actuation and malfunction of the valve and leakage therefrom due to incompletely connecting the head assembly with the coupler when these elements are rapidly and repeatedly assembled in the field. Other problems include rapid wear of the valve and its actuating components, jamming and sticking of guided valves in their guides due to corrosion thereof and entrapment of sand and dirt particles between valve stems and guides, and destructive corrosion of the interfitting parts of the coupler and head assembly components preventing their rapid assembly in the field.

The present invention has for its major object the provision of a valving device designed to prevent improper actuation and malfunction of the valve under the most severe operating conditions. Basically, that part of the device to be connected into the main pipe line includes a coupler forming a duct having end openings into which irrigation pipe ends are receivable, a chamber outside the duct communicating with the side thereof, a valve seat and a valve in the chamber for controlling the flow. In addition, a spring in the chamber transmits thrust acting through the valve for holding the valve against the seat interrupting water flow through the side chamber when the remainder of the valving device is disconnected from the coupler body.

Included in the assembly making up the remainder of the valving device is a tubular element loosely fitting within the open end of the side chamber above the valve seat, a latch loosely holding the tubular element in position, and a long actuator holding the valve out of engagement with the seat and constraining the valve to move laterally relative to the seat in response to lateral limited displacement of the tubing element. Except for the actuator so constraining the valve stem, the valve is unguided in its movement toward and away from the seat, so that the valve can freely move laterally with the actuator without binding.

Furthermore, the valve stem is loosely constrained by the actuator for lateral displacement related to the looseness of the tubing element interfitting within the chamber housing, so that when the tubing is stabbed into the housing chamber the actuator will always and without fail freely receive the valve stem for subsequent actuation of the valve. These characteristics make the valve reliable under all adverse conditions encountered in the field such as corrosion of metal parts changing the fits between the parts.

At the same time, the advantageous general looseness of the interfitting components does not affect the capacity of the valving device to seal off escape of water since a water pressure actuated seal having a particularly advantageous design is located between the tubular element and the chamber housing for water pressure actuated engagement therewith. Other features of the invention include the particular design of the valve stem in relation to the actuator recess receiving the stem and their mutual misalignment, and the provision of a number of spaced chamber wall protrusions acting to loosely guide the tubular element within the chamber housing, as will be described.

Other features and objects of the invention, as well as the details of an illustrative embodiment, will be more fully understood from the following detailed description of the drawings, in which:

Fig. 1 is a vertical elevation taken in section through the made up valving device;

Fig. 2 is a section taken on line 2—2 of Fig. 1;

Fig. 3 is an exploded view of the disassembled valving device taken in a vertical plane extending therethrough and at right angles to the plane of Fig. 1;

Fig. 4 is a perspective view of the gasket used in the coupler component of the device;

Fig. 5 is a perspective view of the quick connection between one end of the coupler component and a pipe end insertible therein; and Fig. 6 is a perspective view of the opposite end of the coupler component.

In Fig. 1 the made up valving device generally indicated at 10 includes a pipe coupler component 11 and an assembly 12 loosely connectible to the coupler component, as will be described. The latter comprises a metal housing 13 forming a horizontal duct 14 having opposite end openings formed by an annular ramp 15 and a split clamp 16 respectively, the openings receiving the ends of irrigation pipes 17 and 18 as shown in Figs. 1 and 3.

Pipe 18 is clamped in position by tightening a bolt 19 shown in Fig. 6 passing through flanges 20 of the upper and lower clamp parts, so that the loose lower clamp part is held firmly to the upper clamp part integral with the coupler 11. A C-shaped element 21 integral with the lower clamp part receives an upper clamp part flange 22 in loose interfitting relation at the opposite side of the clamp from the bolt 19 to complete the interconnection of these parts. Finally, the lower clamp part is provided with a wide flat base 23 for squarely seating the coupler component on the ground against overturning.

Projecting from the opposite open end of the coupler is a semi-cylindrical guide 24 which opens upwardly for receiving the end portion of pipe 17. The end of the latter is guided by the tapered ramp 15 into the coupler duct 14 for rapid making up of the main length of irrigation pipe, as assisted by engagement of a pair of oppositely extending lugs 25 carried by a pipe clamp 26 against the sloping upper edges 24a of the guide. Upon entrance of the end of pipe 17 into the duct 14, the horizontally extending lugs 25 drop downward into notches 27 formed in the guide. Thereafter engagement of the lugs 25 against corresponding lugs 28 carried by the guide prevents withdrawal of pipe 17 from the coupler component 11, unless of course the pipe 17 is lifted so as to disengage lugs 25 and 28.

A large gasket 29 suitably formed of an elastomer material such as rubber, as shown in Figs. 3 and 4, is located within the coupler component duct adjacent the inner wall of the coupler so as not to restrict water flow therethrough. The opposite ends of the gasket are provided with flexible annular lips 30 through which the ends of pipe 17 and 18 are received as shown in Fig. 3. Water pressure within the main duct 14 acts to press these flexible lips into sealing engagement with the pipes to seal off escape of water between the coupler and the pipes. Since the latter are held by the coupler spaced from the inner wall of the guide 24 and the gasket 29, the accumulation of sand and other foreign matter thereon cannot interrupt the flow of water through the pipes nor can it hinder guided stabbing of the pipe 17 into the coupler component as described.

The housing 13 also extends upwardly to form an upwardly opening side chamber 33 outside the main duct and communicating therewith through an outlet 34 formed in the duct side by an internal flange 35. The latter seats an upstanding portion 36 of the gasket 29 forming a gasket opening 37 co-extensive with the outlet 34, and it also seats the base of a conical helical spring 38 extending upwardly in chamber 33.

The upper free end of the spring is seated against the underside of a metallic valve body 39 extending generally laterally in the chamber 33, urging the entire valve indicated at 40 upwardly toward an annular seat 41 formed by the inner wall of the housing 13, the innermost periphery of the seat forming the narrowest cross section of the chamber 33. For positively sealing against the frustro-conical seat 41, the similarly shaped valve body 39 is provided with a rubber jacket or cover 43 facing the seat and having outstanding annular ridges 44 to compressively engage the seat upon valve closure. Once the valve is closed, as shown in Fig. 3, a plate 45 clamped against the upper side of the body 39 by a nut 47a limits lateral shifting of the valve relative to the seat since the plate fits within the opening 42 and engages its periphery to block seat displacement.

Finally, the valve includes a narrow central stem 47 with a threaded lower end portion engaged by nuts 47a and 47b holding the stem to the body 39. The upper portion of the stem is loosely received within axial recess 48 formed in the lower end portion of a downwardly extending threaded shaft 49 when the assembly 12 is loosely coupled with the coupler component 11 of the valving device. The upper end of the stem is tapered to a point at 50 to transmit endwise thrust from the spring to the shaft 49 with minimum frictional resistance to turning of the shaft relative to the stem, as controlled by shaft hand wheel 51.

The stem 47 is also axially misaligned with respect to the shaft 49 so that opposite sides of the stem engage opposite insides of the recess 48 at substantially vertically spaced locations 52 and 53. Thus, the stem is loosely constrained by the shaft to move laterally and longitudinally relative to the seat, and the valve 40 is loosely constrained to move laterally and longitudinally relative to the seat 41 in response to lateral and longitudinal displacement of the shaft relative to the coupler component 11. The valve 40 is otherwise unguided in the chamber 33 so that it accommodates itself to the limited lateral movement of the shaft 49, to be described, as well as being moved up and down by the shaft upon turning of the hand wheel 51.

Assembly 12 includes in addition to the shaft 49 and hand wheel 51 an elbow-shaped housing 54 forming a similarly shaped conduit 55 in communication with the chamber 33 through a tubular portion 56 of the housing 54. A cylindrical neck portion 57 of the housing 13, including an outwardly extending frustro-conical flange 58, loosely receives the tube 56 inserted downwardly within the cylindrical portion of chamber 33 formed by the neck 57. Lateral deflection of the tube 56 is limited by its engagement against at least one of the circularly spaced protrusions 59 extending inwardly toward the axis of chamber 33 from the neck 57. These protrusions guide downward insertion of the tube 56 with minimum obstruction in the event of corrosion deposit build up.

When the valve is opened and water is flowing under pressure from chamber 33 upwardly through the conduit 55, escape of water between the tube 56 and the neck 57 is prevented by pressure expansion of the inner and outer flexible lips 60 and 61 of an E-shaped seal 62. The annular seal is located in an annular recess 63 sunk in the inside of flange 58, so that the lips 60 and 61 engage the outside of the tube 56 and the inside of the recess 63 sunk in the flange under the action of water pressure, to effect the sealing function. The seal is stabilized in its downwardly facing position against substantial distortion from its desired E-shape by central thickened annular web 65 spaced between the lips 60 and 61 so that it does not deflect laterally inasmuch as fluid pressure enters these spaces on opposite sides of the web. Thus, the stabilized seal is not displaced from recess 63 by breaking down or making up of the completed valving device even though lip 60 engages the tube 56 being withdrawn from or entering into the upper cylindrical portion of chamber 33.

Elbow shaped housing 54 also includes a horizontal tubular branch 66 opening laterally at 67 to receive a branch pipe end 68. The latter is guided into the opening by an annular tapered ramp 69 forming the opening 67, and held against withdrawal from the opening by engagement of a diametrically opposite pair of lugs 70 on a pipe clamp 71 engaging a similarly opposite pair of lugs 72 carried by a guide 73 integral with the branch 66 of the housing 54. Finally, the circumference of the branch pipe held portion is engaged by the flexible annular lip 74 of a seal 75 received within the recess 76 formed in the inside of housing branch 66, water pressure acting to urge the lip 74 against the pipe.

Water pressure exerted upwardly against the inside of housing 54 as well as spring pressure transmitted through the valve stem 47 to the shaft 49 and then to the housing 54 through a brass fitting 77 act to urge the assembly 12 upwardly and away from the housing 13. However, a single hook-shaped latch 78 pivoted to the housing 54 at 79 engages the underside of the flange 58 to hold the assembly against upward displacement by the spring and water pressure. Only one latch is used so that the operator may quickly disconnect or disassemble the valving device merely by gripping the housing 54 about the shaft 49 and pulling the latch upward extension 80 toward the shaft by quick finger movement. The hooked lower end of the latch then disengages the underside of the flange permitting the assembly 12 to be pushed upward and thereby completely disconnected from the lower housing 13 by the action of the spring 38 transmitting lifting force to the shaft 49. Conversely, assembly of the valving device is facilitated by quick under engagement of the latch 78 with the underside of the flange 58 after the latch has pivoted away from the shaft against the downward and outwardly sloping side of the flange, all accomplished upon downward insertion of the tube 56 into the cylindrical upper portion of chamber 43.

Loose reception of the tube 56 between the guiding protrusions 59 permits the assembly 12 to rock laterally in position, as limited by engagement of the tube with one or more of the protrusions, and by engagement of a plate 82, shown in Fig. 3 to be integral with the housing 54, with the top 83 of the flange 58. However, when the valve is opened downwardly and water pressure together with spring pressure are exerted upon the assembly 12, the plate 82 is lifted slightly off the top 83 of the flange and only the hook 78 retains the assembly 12 from being forced upward to disconnected position. Since the hook is located eccentrically as respects the vertical axis of the shaft 49 centered in the tube 56, the assembly 12 tends to pivot counterclockwise as shown in Fig. 1 until the tube 56 engages the protrusion 59, preventing further rocking of the assembly as respects the lower housing 13. At the same time, the shaft 49 and valve stem 47 are axially misaligned; however, such misalignment does not hinder valve operation in view of the above discussion. On the contrary, the valve 40 readily adjusts itself to the slightly pivoted condition of the shaft 49, and in fact, the valve pivots clockwise to compensate for the counterclockwise pivoting of the shaft relative to the seat 41 all as shown in Fig. 1.

It will also be observed that the lower end of the shaft 49 forming the mouth of the recess 48 is tapered outwardly at 85 to guide the tapered end of the stem 47 into the recess when the valve device is assembled. The recess 48 is oversized in relation to the valve stem so that the latter always enters the recess no matter what the angularity from the vertical is taken by the shaft as the tube 56 is loosely guided by the protrusions 59 into the upper portion of chamber 33.

It will further be observed that the plate 45 carried on the valve body 39 is undersized in relation to the opening 42 so as to always be received therein as the valve is closed even though the assembly 12 is pivoted as shown in Fig. 1. However, the plate is large enough to engage the periphery of the opening 42 and prevent lateral dislodgement of the valve off the seat 41 when in closed condition, and also to locate the stem 47 in approximate centered condition with respect to the opening 42 so as to be receivable within the recess 48 formed in the shaft 49.

I claim:

1. An improved irrigation valving device comprising means forming a duct having end openings into which irrigation pipe ends are receivable and defining a chamber outside the duct communicating with the side thereof and an annular valve seat forming a chamber opening through which flow of fluid from said duct is controllable, a valve in said chamber for controlling said flow, an assembly loosely coupled with said means and forming a conduit in flow receiving communication with said chamber opening, said assembly including an elongated actuator holding the valve out of seat engagement and constraining the open valve to move laterally relative to said seat in response to lateral displacement of the assembly relative to said means accommodated by said loose coupling, a spring in said chamber transmitting thrust acting through the valve upon said assembly to take up said coupling looseness and to urge the valve toward said seat for holding the valve in seated condition interrupting the flow when said actuator is disengaged from the valve, and means sized for reception within the chamber opening formed by said annular seat for approximately centering the valve with respect to said actuator when the valve is in engagement with the seat.

2. An improved irrigation valving device comprising metallic means forming a duct having end openings into which irrigation pipe ends are receivable and defining a chamber outside the duct communicating with the side thereof and an annular valve seat forming a chamber opening through which flow of fluid from said duct is controllable, a valve in said chamber for controlling said flow, an assembly loosely coupled with said means and forming a conduit in flow receiving communication with said chamber opening, said assembly including an elongated actuator holding the valve out of seat engagement and loosely constraining the open valve to move laterally relative to said seat in response to limited lateral displacement of the assembly relative to said means accommodated by said loose coupling, and a spring in said chamber transmitting thrust acting through the valve upon said assembly to take up said coupling looseness and to urge the valve toward said seat for holding the valve in seated condition interrupting the flow when said actuator is disengaged from the valve, said valve including means sized for reception within the chamber opening formed by said annular seat for approximately centering the valve with respect to said actuator when the valve is in engagement with the seat.

3. An improved irrigation valving device comprising metallic means forming a duct having end openings into which irrigation pipe ends are receivable and defining a chamber outside the duct communicating with the side thereof and an annular valve seat forming a chamber opening through which flow of fluid from said duct is controllable, a valve in said chamber for controlling said flow, an assembly loosely coupled with said means and forming a conduit in flow receiving communication with said chamber opening, said assembly including an elongated actuator holding the valve out of seat engagement and loosely constraining the open valve to move laterally relative to said seat in response to limited lateral displacement of the assembly relative to said means accommodated by said loose coupling, and a spring in said chamber having a laterally movable free end portion transmitting thrust acting through the valve upon said assembly to take up said coupling looseness and to urge the valve toward said seat for holding the valve in seated condition interrupting the flow when said actuator is disengaged from the valve, said valve including means sized for reception within the chamber opening formed by said annular seat for approximately centering the valve with respect to said actuator when the valve is in engagement with the seat.

4. An improved irrigation valving device comprising metallic means forming a duct having end openings into which irrigation pipe ends are receivable and defining a chamber outside the duct communicating with the side thereof and an annular valve seat forming a chamber opening through which flow of fluid from said duct is controllable, a valve in said chamber for controlling said flow and including an elastomeric portion engageable with the seat to interrupt said flow, an assembly loosely coupled with said means and forming a conduit in flow receiving communication with said chamber opening, said assembly including an elongated actuator holding the valve out of seat engagement and constraining the open valve to move laterally relative to said seat in response to lateral displacement of the assembly relative to said means accommodated by said loose coupling, and a spring in said chamber transmitting thrust acting through the valve upon said assembly to take up said coupling looseness and to urge the valve toward said seat for holding the valve in seated condition interrupting the flow when said actuator is disengaged from the valve, said valve including means sized for reception within the chamber opening formed by said annular seat for approximately centering the valve with respect to said actuator when the valve is in engagement with the seat.

5. An improved irrigation valving device comprising metallic means forming a duct having end openings into which irrigation pipe ends are receivable and defining a chamber outside the duct communicating with the side thereof and an annular valve seat forming a chamber opening through which flow of fluid from said duct is controllable, a valve in said chamber for controlling said flow, an assembly loosely coupled with said means and forming a conduit in flow receiving communication with said chamber opening, said assembly including an elongated actuator holding the valve out of seat engagement and constraining the open valve to pivot laterally relative to said seat and the assembly in response to lateral pivoting displacement of the assembly relative to said means accommodated by said loose coupling, and a coil spring in said chamber transmitting thrust acting through the valve upon said assembly to take up said coupling looseness and to urge the valve toward said seat for holding the valve in seated condition interrupting the flow when said actuator is disengaged from the valve, said valve including means sized for reception within the chamber opening formed by said annular seat for approximately centering the valve with respect to said actuator when the valve is in engagement with the seat.

6. An improved irrigation valving device comprising means forming a main duct having end openings into which irrigation pipe ends are receivable and defining an upwardly opening chamber outside the duct and communicating therewith through an outlet in the duct side and an annular valve seat forming a chamber opening spaced above said outlet and through which flow of fluid from said duct is controllable, a valve in said chamber between the seat and said outlet for controlling said flow, an assembly loosely coupled with said means and forming a conduit in flow receiving communication with said chamber opening, said assembly including an elongated downwardly extending actuator holding the valve out of seat engagement loosely constraining the open valve to move laterally and lonigtudinally relative to said seat in response respectively to lateral and longitudinal displacement of the assembly relative to said means limited by the looseness of said coupling, and a spring in said chamber transmitting thrust acting upwardly through the valve upon said assembly to take up said coupling looseness and to urge the valve toward said seat for holding the valve in seated condition intermrupting the flow when said actuator is disengaged from the valve, said valve including means sized for reception within the chamber opening formed by said annular seat for approximately centering the valve with respect to said actuator when the valve is in engagement with the seat.

7. The invention as defined in claim 6 in which said valve includes a stem projecting upwardly in said chamber into engagement with the actuator.

8. The invention as defined in claim 7 in which the lower end portion of said actuator contains an axially elongated recess loosely receiving the upper portion of said stem.

9. The invention as defined in claim 8 in which the stem has a reduced area upper end in thrust transmitting engagement with the recess inside.

10. The invention as defined in claim 8 in which said stem is out of axial alignment with said actuator recess.

11. The invention as defined in claim 10 in which said stem is in engagement with vertically spaced opposite side wall portions of said recess.

12. The invention as defined in claim 10 in which said actuator is out of axial alignment with a normal to the plane of said seat, and said stem is in closer alignment with said normal than is said actuator.

13. The invention as defined in claim 8 in which said assembly includes an elbow forming said conduit and a latch engageable with said means, and in which said actuator is threaded for up and down advancement in said chamber displacing the valve respectively toward and away from the seat.

14. The invention as defined in claim 13 in which said chamber has a substantially cylindrical wall extending upwardly above the seat, and in which said elbow has a branch received downwardly into the cylindrical chamber out of axial alignment therewith.

15. The invention as defined in claim 14 comprising a plurality of spaced chamber wall protrusions extending laterally toward said elbow branch for loosely guiding its downward insertion into said chamber, said branch being held in engagement with at least one of said protrusions by said thrust transmission.

16. The invention as defined in claim 8 in which said valve includes a metal body and a rubber annulus facing the seat and engageable therewith to interrupt said flow.

17. The invention as defined in claim 16 in which said means receivable within the chamber opening comprises a transverse metallic plate sized for reception within the chamber opening formed by said annular seat when said rubber annulus engages the seat to approximately center the stem with respect to said chamber opening.

References Cited in the file of this patent

UNITED STATES PATENTS

| 2,751,927 | Kinney | June 26, 1956 |

FOREIGN PATENTS

| 14,499 | Great Britain | of 1894 |
| 470,266 | France | of 1914 |
| 734,806 | Great Britain | of 1955 |